United States Patent [19]
Usui et al.

[11] Patent Number: 5,370,743
[45] Date of Patent: Dec. 6, 1994

[54] METHODS FOR CONTROLLING THE CONCENTRATION OF DETERGENTS

[75] Inventors: Eiji Usui, Kanagawa; Kazuo Nishizawa, Niigata, both of Japan

[73] Assignees: Speedfam Clean System Company Limited; Clean Technology Company Limited, Kanagawa, Japan

[21] Appl. No.: 3,128

[22] Filed: Jan. 12, 1993

[30] Foreign Application Priority Data

Jan. 21, 1992 [JP] Japan .................. 4-030199

[51] Int. Cl.$^5$ .................................. B08B 7/04
[52] U.S. Cl. ............................ 134/18; 134/25.2
[58] Field of Search ............ 134/10, 25.2, 18, 57 R, 134/57 D; 222/52; 137/93

[56] References Cited

U.S. PATENT DOCUMENTS

| | | | |
|---|---|---|---|
| 3,013,572 | 12/1961 | Lahti et al. | 137/93 |
| 4,121,767 | 10/1978 | Jensen | 137/93 X |
| 4,648,043 | 3/1987 | O'Leary | 137/93 X |
| 4,733,798 | 3/1988 | Brady et al. | 222/23 |
| 4,867,193 | 9/1989 | Hayashi et al. | 137/93 |

Primary Examiner—Richard O. Dean
Assistant Examiner—Saeed Chaudhry
Attorney, Agent, or Firm—Fitch, Even, Tabin & Flannery

[57] ABSTRACT

Methods and apparatus for automatically controlling the concentration of a detergent in a cleaning solution determine the electrical conductivity Y of a cleaning solution 2 with a sensor 4, convert the electrical conductivity Y into the detergent concentration X using equation $Y=aX+b$ (wherein Y=electrical conductivity of the cleaning solution, X=concentration of the detergent, a=inherent factor of the detergent, and b=electrical conductivity of the solvent), compare the converted detergent concentration with a preset value given in terms of detergent concentration, and actuate concentration controlling means according to the result of comparison.

3 Claims, 2 Drawing Sheets

METHODS FOR CONTROLLING THE CONCENTRATION OF DETERGENTS

FIELD OF THE INVENTION

This invention relates to methods and apparatus for automatically controlling the concentration of detergents in solutions used with precision cleaning devices for cleaning hard discs for computers, magnetic heads, glass panes for liquid crystal displays, silicon wafers, and other industrial parts and products.

BACKGROUND OF THE INVENTION

The concentration of the detergent in the cleaning solution used with the precision cleaning devices of the above type often changes during cleaning due to the consumption or natural deterioration of the detergent, dilution with the water carried in by the work or added for the adjustment of the solution level and other causes. On such occasions, the concentration often falls below the lowest limit of its desirable range. Accordingly, suitable means for automatically monitoring and controlling the detergent concentration has been strongly desired.

To meet this requirement, an apparatus to control the percentage concentration of the detergent on the basis of the previously measured electrical conductivity ($\mu$S) of the cleaning solution has been commercially available. This apparatus compares the electrical conductivity of the cleaning solution measured from time to time with a sensor with the previously determined electrical conductivity corresponding to the appropriate detergent concentration. The detergent feed pump is turned on and off according to the result of this comparison so that the measured concentration is always kept with the desired limits.

However, this conventional controller uses the as-measured electrical conductivity for concentration control. Therefore, the measured values are displayed and compared with the reference value preset in units of electrical conductivity. Consequently, it has been impossible to learn the detergent concentration directly from the measured electrical conductivity. In specifying the proper concentration range, in addition, it has been necessary to determine the electrical conductivity corresponding to the proper concentration as a controller input from the interrelationship therebetween. Thus, the conventional controller has not been easy to deal with. Besides, each detergent has its own inherent electrical conductivity that differs among different detergents. When a new detergent is used, therefore, its inherent interrelationship between concentration and electrical conductivity must be determined by experiment to that the electrical conductivity corresponding to its proper concentration can be derived therefrom.

SUMMARY OF THE INVENTION

The principal object of this invention is to provide methods and apparatus for automatically controlling the percentage concentration of the detergent in cleaning solutions.

Another object of this invention is to provide methods and apparatus that facilitate the input of the preset reference value in the controller and the resetting operation involved in the change of detergent type from one to another.

To achieve the above objects, a method for controlling the concentration of the detergent in a cleaning solution according to this invention comprises the steps of determining the electrical conductivity of the cleaning solution in a cleaning vessel, converting the determined electrical conductivity into the concentration of the detergent using equation $Y=aX+b$ (wherein $Y$=electrical conductivity of the cleaning solution, $X$=concentration of the detergent, $a$=inherent factor of the detergent, and $b$=electrical conductivity of the solvent), comparing the converted concentration of the detergent with a preset value given in terms of detergent concentration, and actuating a concentration controlling means according to the result of comparison.

The preset reference concentration specifies the upper and lower limits of an appropriate detergent concentration range. When the actual detergent concentration falls to the lower limit, the concentration controlling means starts to supply a makeup detergent. When the actual detergent concentration returns to the upper limit, the supply of the makeup detergent stops.

Also, the upper and lower limits of an appropriate detergent concentration range plus an intermediate point therebetween may be preset. Then, the concentration controlling means starts to supply a makeup detergent when the actual detergent concentration falls to the lower limit and stops the supply of the makeup detergent when the actual concentration returns to the intermediate point. The concentration controlling means also starts to supply a makeup solvent when the actual detergent concentration rises to the upper limit and stops the supply of the makeup solvent when the actual concentration falls to the intermediate point.

An apparatus for controlling the concentration of the detergent in a cleaning solution according to this invention comprises a sensor to determine the electrical conductivity of a cleaning solution in a cleaning vessel, a controller to convert the electrical conductivity determined by the sensor into the concentration of the detergent contained in the solution using equation $Y=aX+b$ (wherein $Y$=electrical conductivity of the cleaning solution, $X$=concentration of the detergent, $a$=inherent factor of the detergent, and $b$=electrical conductivity of the solvent), compare the converted detergent concentration with the preset reference concentration, and outputs a control signal according to the result of comparison, and a concentration controlling means that adjusts the detergent concentration according to the control signal from the controller.

Other features and advantages of this invention will become apparent from the following detailed description.

DETAILED DESCRIPTION OF THE PREFERRED EMBODIMENTS

Figure 1:
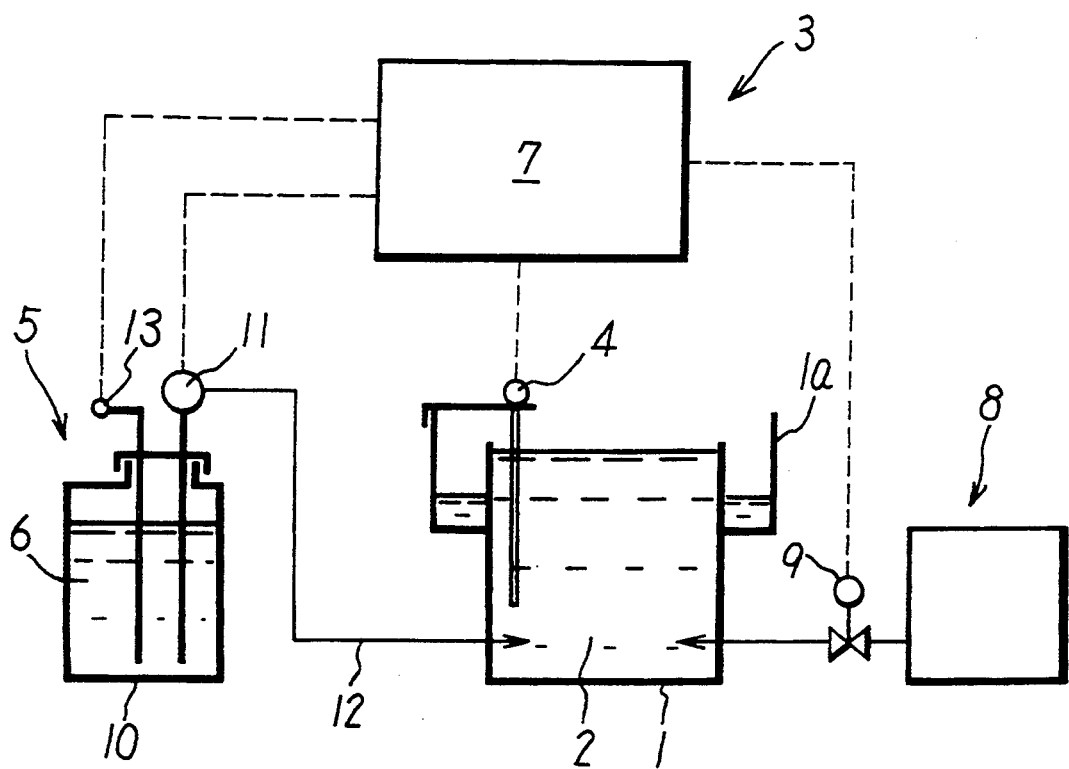
FIG. 1 is a block diagram showing a preferred embodiment of a control apparatus according to this invention.

In FIG. 1, reference numeral 1 designates a cleaning vessel in a cleaning apparatus, in which the work is cleaned with a cleaning solution 2. Reference numeral 3 denotes a concentration control unit to control the concentration of the detergent contained in the cleaning solution 2. The control unit 3 has a sensor to determine the electrical conductivity of the cleaning solution 2 in the cleaning vessel 1, a feeder to supply a raw detergent 6 into the cleaning vessel 1, and a controller 7 to control the raw detergent feeder 5 according to the control signal from the sensor 4. The cleaning vessel 1 has a device to supply a solvent such as water, with a valve 9 attached thereto is adapted to open and close according to the control signal from the controller 7, thereby supplying the required amount of makeup solvent to keep the cleaning solution 2 in the cleaning vessel 1 at a given level.

The raw detergent feeder 5 comprises a reserve vessel 10 to hold the raw detergent 6, a feed pump 11 to supply the raw detergent 6 to the cleaning vessel 1 through a feed pipe 12, and a level gage 13 to check the level of the raw detergent 6. The feed pump 11 and level gage 13 are connected to the controller 7.

Figure 2:
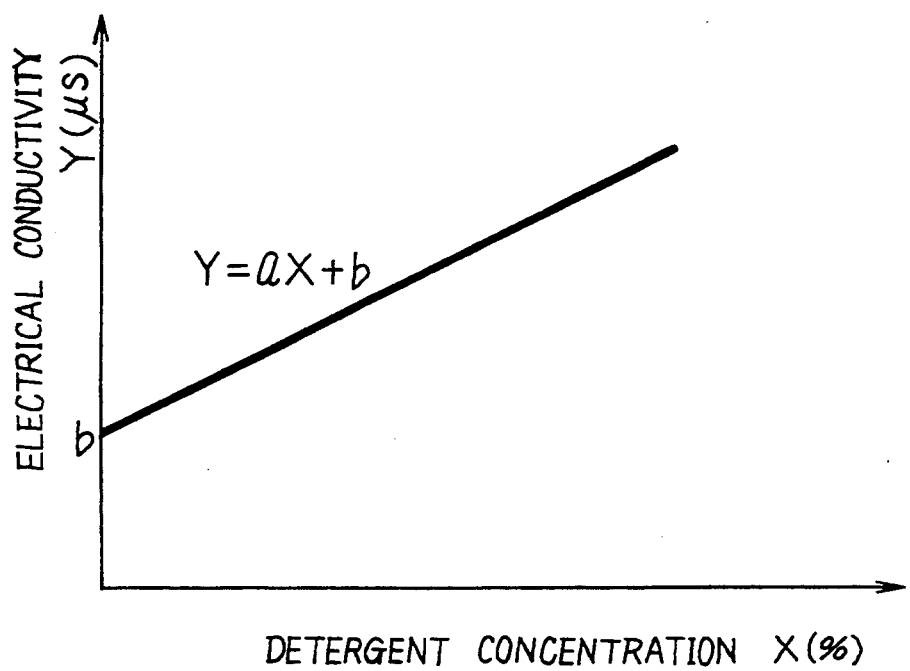
FIG. 2 is a graphical representation of the relationship between the concentration of the detergent in a cleaning solution and the electrical conductivity of the cleaning solution.

The controller 7 memorizes equation $Y=aX+b$ (wherein Y=electrical conductivity of the cleaning solution, X=concentration of the detergent, a=inherent factor of the detergent, and b=electrical conductivity of the solvent) that represents the approximately proportional relationship between the concentration (in percentage) of the detergent in the cleaning solution 2 and the electrical conductivity ($\mu$S) of the solution as shown in FIG. 2. Using this equation, the controller 7 converts the electrical conductivity Y of the cleaning solution 2 determined by the sensor 4 into the detergent concentration X. Then, the controller 7 compares the detergent concentration X with the preset percentage concentrations $A_1$ and $A_2$ indicating the upper and lower limits of the predetermined proper range of the detergent concentration, sends out a control signal based on the result of comparison to the raw detergent feeder 5, and controls the detergent concentration by starting and stopping the supply of the raw detergent 6 to the cleaning vessel 1 according to the control signal. Furthermore, provision is made to give an alarm when the converted detergent concentration is outside the upper and lower limits $B_1$ and $B_2$ of the critical concentration range input therein.

Now the operation of the concentration control unit 3 will be described below. Before using the concentration control unit 3, the values a and b inherent to the detergent and solvent to be used must be substituted in equation $Y=aX+b$ input in the controller 7.

The values a and b can be substituted either by inputting the preliminarily determined values or by inputting the values obtained in line. In the former case, b is obtained by determining the electrical conductivity of a given amount of water put as a solvent in a suitable container. The value of b for city water is approximately 130. Then, the electrical conductivity of a cleaning solution prepared by adding a given amount of a detergent to the above water is determined. When the water and detergent are mixed in a volume ratio of 9:1, for example, the detergent concentration of the solution X is 10%. If the electrical conductivity of the solution is 260, a is 13 as the above equation is now expressed as $260=10a+130$. By substituting $a=13$ and $b=130$ thus obtained in the above equation, equation $Y=13X+130$ to describe their relationship between the detergent and water to be used. The in-line input can be achieved by typing the input keys according to the message displayed by the controller 7. Then, the same measurement and input as mentioned before are automatically performed according to the program built in the controller 7.

Pure water may be used as the solvent. The electrical conductivity b of pure water is usually between approximately 1 and 1.5.

Next, the upper and lower limits $A_1$ and $A_2$ of the proper concentration range of the cleaning solution and the upper and lower limits $B_1$ and $B_2$ of the critical concentration range thereof are input in the controller 7 expressed in terms of the detergent concentration.

Figure 3:
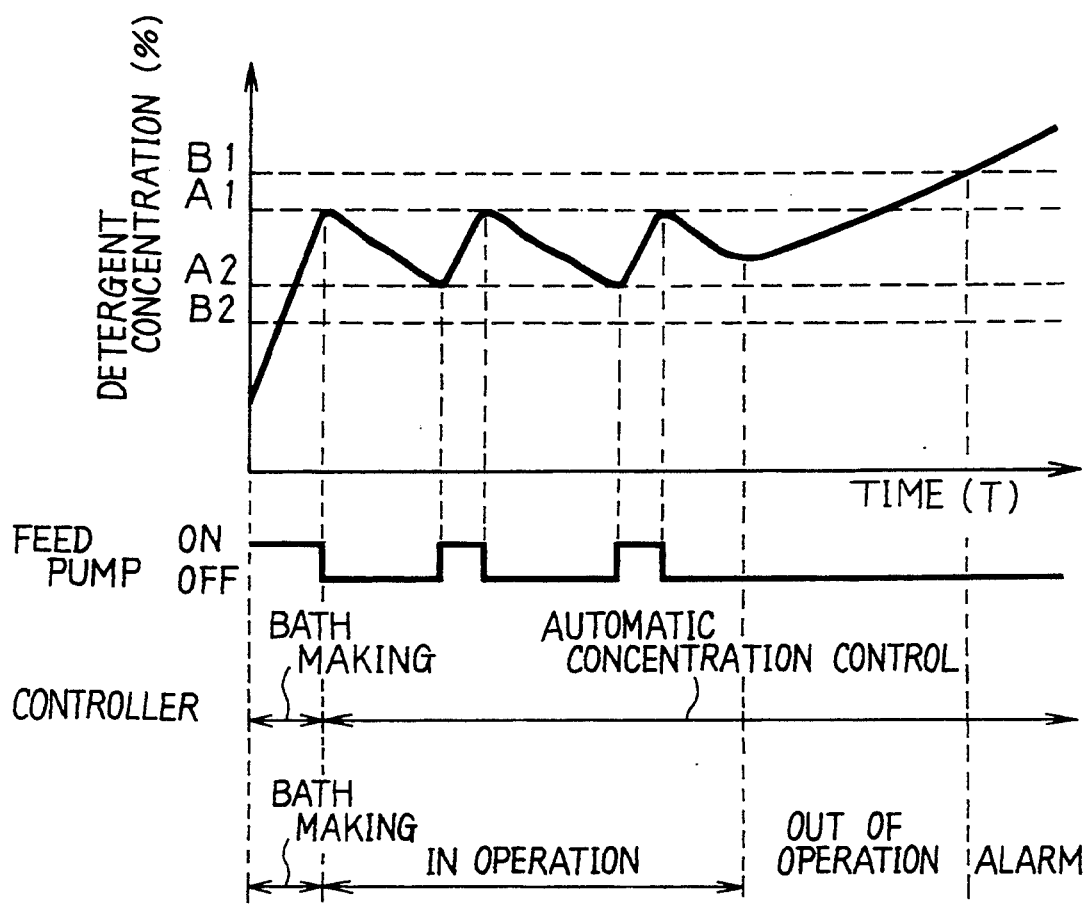
FIG. 3 is a time chart of a method for controlling the detergent concentration.

When a given amount of water is put in the cleaning vessel 1 and the controller 7 is set in a bath-making mode, the control signal from the controller 7 starts the feed pump 11 of the raw detergent feeder 5, whereby the raw detergent 6 is supplied to the cleaning vessel 1 to prepare a cleaning solution therein, as shown in FIG. 3. At this time, the conductivity sensor 4 measures the electrical conductivity Y of the cleaning solution, which is converted into the detergent concentration X using the equation described before, with the converted value compared with the preset limits $A_1$ and $A_2$ of the proper concentration range. When the detergent concentration rises to the upper limit $A_1$ of the proper concentration range, the controller 7 sends out a control signal to stop the supply of the raw detergent 6 from the feed pump 11. Thus, a cleaning solution having a proper detergent concentration is automatically prepared. In the bath-making mode, no alarm is given when the initial detergent concentration is below the preset limit $B_2$ of the critical concentration range.

By switching from the bath-making mode to the automatic concentration control mode, the controller 7 automatically controls the detergent concentration. To be more specific, the conductivity sensor 4 measures the electrical conductivity Y of the cleaning solution in the cleaning vessel 1, which is then converted into the detergent concentration X, with the converted value compared with the preset limits $A_1$ and $A_2$ of the proper concentration range. When the detergent concentration falls to the lower limit $A_2$ of the proper concentration range, the controller 7 sends out a control signal to start the feed pump 11 of the raw detergent feeder 5. When the detergent concentration raises back to the upper limit $A_1$ with the supply of the raw detergent 6 into the cleaning vessel 1, the controller 7 sends out a control signal to stop the supply of the raw detergent 6 from the feed pump 11. By repeating the same actions, the detergent concentration is automatically kept in the proper concentration range.

A level gage not shown checks the level of the cleaning solution 2 in the cleaning vessel 1 so that the proper solution level is always maintained. This level control can be performed in various ways. For example, the level gage sends out a signal to open the valve 9 to start the supply of makeup water when the level drops as a result of the consumption of the cleaning solution. Otherwise, the valve 9 is always opened slightly to continuously supply such a small quantity of water that the cleaning solution 2 consistently flows over the brim of the cleaning vessel 1. The illustrated embodiment employs the latter method. In the illustrated embodiment, a liquid gage to determine the level of the overflown cleaning solution is provided in an overflow vessel 1a so that the opening of the valve 9 is adjusted accordingly.

An alarm is given when the detergent concentration exceeds the preset upper limit $B_1$ of the critical concentration range as a result of, for example, the evaporation of the solvent during downtime or falls below the preset lower limit $B_2$ as a result of the supply of excess water.

Provision should preferably be made to allow the display of the controller 7 to indicate the electrical conductivity Y determined by the conductivity sensor 4, detergent concentration X obtained by conversion, and preset limits $A_1$, $A_2$, $B_1$ and $B_2$ of the proper and critical detergent concentration ranges.

While the embodiment Just described is designed to cope with the in-process drop of the detergent concentration alone, provision may also be made to cope with both the drop and rise of the detergent concentration. For example, an intermediate point $A_0$ may also be preset between the upper and lower limits $A_1$ and $A_2$ of the proper concentration range. Then, the feed pump 11 can be designed to start the supply of the raw detergent 6 to the cleaning vessel 1 when the detergent concentration falls to the preset lower limit $A_2$, thereby raising the detergent concentration of the cleaning solution. The feed pump 11 stops the supply when the detergent concentration returns to the intermediate point $A_0$. When the detergent concentration rises to the upper limit $A_1$, the valve 9 opens to supply water into the cleaning vessel 1 to lower the detergent concentration. The valve 9 closes when the detergent concentration falls to the intermediate point $A_0$.

As described before, this invention converts the electrical conductivity of a cleaning solution into the percentage concentration of the detergent using equation $Y = aX + b$, and controls the detergent concentration of the cleaning solution using the percentage concentration thus derived. The measured and preset values displayed and input in percentage concentration are easier to read and learn than those expressed in terms of electrical conductivity. Even the change of the detergent type does not call for complicated work as the values of a and b used in the equation can be easily obtained by preparing a cleaning solution of a given concentration.

What is claimed is:

1. A method for controlling the detergent concentration comprising the steps of determining the electrical conductivity of a cleaning solution containing a detergent in a cleaning vessel with a sensor, converting the determined electrical conductivity into the concentration of the detergent using equation $Y = aX + b$ (wherein Y = electrical conductivity of the cleaning solution, X = concentration of the detergent, a = inherent factor of the detergent, and b = electrical conductivity of the solvent), comparing the converted detergent concentration with a preset value given in terms of detergent concentration, and actuating concentration controlling means according to the result of comparison.

2. A detergent concentration controlling method according to claim 1, in which the preset value consists of upper and lower limits of a proper concentration range of the detergent in the cleaning solution, detergent concentration controlling means starting the supply of a raw detergent when the detergent concentration of the cleaning solution falls to the lower limit and stopping the supply when the detergent concentration rises back to the upper limit.

3. A detergent concentration controlling method according to claim 1, in which the preset value consists of upper and lower limits of a proper concentration range of the detergent in the cleaning solution and an intermediate point therebetween, detergent concentration controlling means starting the supply of a raw detergent when the detergent concentration falls to the lower limit, stopping the supply thereof when the detergent concentration rises back to the intermediate point, starting the supply of a solvent when the detergent concentration rises to the upper limit and stopping the supply thereof when the detergent concentration falls back to the intermediate point.

* * * * *